United States Patent [19]
Herold et al.

[11] Patent Number: 5,932,681
[45] Date of Patent: Aug. 3, 1999

[54] METHOD OF PREPARING AN OPTICAL POLYMERIZATE

[75] Inventors: Robert D. Herold, Monroeville; Michael O. Okoroafor, Export, both of Pa.

[73] Assignee: PPG Industries Ohio, Inc., Cleveland, Ohio

[21] Appl. No.: 09/037,106

[22] Filed: Mar. 9, 1998

[51] Int. Cl.⁶ .................................................. C08G 18/42
[52] U.S. Cl. ........................... 528/81; 359/241; 524/89; 524/110; 524/112; 524/190; 524/715; 524/719; 524/751; 524/753
[58] Field of Search ................................ 528/81; 359/241; 524/89, 110, 112, 190, 715, 719, 751, 753

[56] References Cited

U.S. PATENT DOCUMENTS

| | | | |
|---|---|---|---|
| 3,361,706 | 1/1968 | Meriwether et al. | 260/39 |
| 3,562,172 | 2/1971 | Hisatake et al. | 252/300 |
| 3,567,605 | 3/1971 | Becker | 204/158 |
| 3,578,602 | 5/1971 | Histake et al. | 252/300 |
| 4,166,043 | 8/1979 | Uhlmann et al. | 252/300 |
| 4,215,010 | 7/1980 | Hovey et al. | 252/300 |
| 4,342,668 | 8/1982 | Hovey et al. | 252/586 |
| 4,367,170 | 1/1983 | Uhlmann et al. | 252/586 |
| 4,637,698 | 1/1987 | Kwak et al. | 351/163 |
| 4,689,387 | 8/1987 | Kajimoto et al. | 528/76 |
| 4,780,522 | 10/1988 | Kajimoto et al. | 528/76 |
| 4,816,584 | 3/1989 | Kwak et al. | 344/71 |
| 4,818,096 | 4/1989 | Heller et al. | 351/163 |
| 4,826,977 | 5/1989 | Heller et al. | 544/70 |
| 4,880,667 | 11/1989 | Welch | 427/160 |
| 4,931,219 | 6/1990 | Kwiatkowski et al. | 252/586 |
| 4,931,220 | 6/1990 | Haynes et al. | 252/586 |
| 5,059,673 | 10/1991 | Kanemura et al. | 528/67 |
| 5,066,818 | 11/1991 | Gemert et al. | 549/389 |
| 5,238,931 | 8/1993 | Yoshikawa et al. | 514/184 |
| 5,274,132 | 12/1993 | VanGemert | 549/389 |
| 5,294,666 | 3/1994 | Okada et al. | 524/609 |
| 5,352,758 | 10/1994 | Kanemura et al. | 528/85 |
| 5,384,077 | 1/1995 | Knowles | 252/586 |
| 5,395,909 | 3/1995 | Shimuta et al. | 528/49 |
| 5,405,958 | 4/1995 | VanGemert | 544/71 |
| 5,429,774 | 7/1995 | Kumar | 252/586 |
| 5,446,398 | 11/1995 | Van Gemert et al. | 252/586 |
| 5,498,686 | 3/1996 | Effer et al. | 528/76 |
| 5,594,088 | 1/1997 | Nagata et al. | 528/77 |
| 5,608,115 | 3/1997 | Okazaki et al. | 568/61 |
| 5,652,321 | 7/1997 | Kawauchi et al. | 528/76 |
| 5,679,756 | 10/1997 | Zhu et al. | 528/65 |
| 5,693,738 | 10/1997 | Okazaki et al. | 528/51 |

FOREIGN PATENT DOCUMENTS

| | | |
|---|---|---|
| 0 802 431 | 10/1997 | European Pat. Off. . |
| 0 803 743 | 10/1997 | European Pat. Off. . |
| 0 803 744 | 10/1997 | European Pat. Off. . |

OTHER PUBLICATIONS

English Abstract: JP 62/195383, Toray Ind., Inc. "New spiro–naphtho pyran cpd . . ."; 1987.

*Techniques in Chemistry*, vol. III, "Photocromism," Chapter 3, Glenn H. Brown, Editor, John Wiley and Sons, Inc., New York, 1971.

*Primary Examiner*—Rachel Gorr
*Attorney, Agent, or Firm*—Irwin M. Stein; James R. Franks

[57] ABSTRACT

Describes a method of preparing a polymerizate by polymerizing a two-component organic composition comprising: a first component containing a polyfunctional reactant having two or more functional groups selected from isocyanate, isothiocyanate and combinations of isocyanate and isothiocyanate groups; and a second component containing a polythiol represented by the following general formula I,

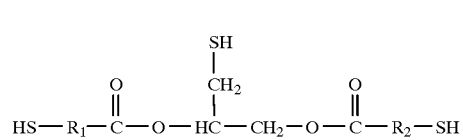

wherein $R_1$ and $R_2$ are each selected from the group consisting of straight or branched chain alkylene, e.g., methylene and ethylene, cyclic alkylene, phenylene and $C_1$–$C_9$ alkyl substituted phenylene. The second component may also optionally contain a reactive hydrogen compound that is different than the polythiol of general formula I. Polymerizates prepared according to the present invention are useful as ophthalmic lenses and have a refractive index of at least 1.57, an Abbe number of at least 33 and an initial Barcol hardness of at least 1. Also described are photochromic articles prepared from such polymerizates.

17 Claims, No Drawings

METHOD OF PREPARING AN OPTICAL POLYMERIZATE

DESCRIPTION OF THE INVENTION

The present invention relates to a method of preparing a polymerizate from a two-component organic composition, the polymerizate having a refractive index of at least 1.57, an Abbe number of at least 33 and an initial Barcol hardness of at least 1. More particularly, the present invention relates to polymerizing certain two-component organic compositions comprising at least one polyfunctional reactant having two or more isocyanate and/or isothiocyante groups, and a polythiol monomer.

A number of organic polymeric materials, e.g., plastics, have been developed as alternatives and replacements for glass in applications such as optical lenses, fiber optics, windows and automotive, nautical and aviation transparencies. As used herein, the term 'glass' is meant to refer to silica-based inorganic glass. These polymeric materials can provide advantages relative to glass, including, shatter resistance, lighter weight for a given application, ease of molding and ease of dying. Representative examples of such polymeric materials include, poly(methyl methacrylate), thermoplastic polycarbonate and poly[diethylene glycol bis(allylcarbonate)].

The refractive indices of many polymeric materials are generally lower than that of glass. For example, the refractive index of poly[diethylene glycol bis(allylcarbonate)] is about 1.50, compared to that of high index glass, which can range, for example, from 1.60 to 1.80. When fabricating lenses to correct a given degree of visual defect, e.g., a correction for myopia, the use of a polymeric material having a lower refractive index will require a thicker lens relative to a material having a higher refractive index, e.g., high index glass. If the degree of correction required is substantial, e.g., in the case of severe myopia, a lens fabricated from a low index polymeric material can become so thick as to negate any benefit of reduction in weight relative to an equivalent degree of correction obtained from a higher refractive index lens, e.g., a high index glass lens. In addition, thicker optical lenses are not aesthetically desirable.

It is known that polymeric materials having refractive indices of greater than 1.50 can be prepared from polyisocyanates and polythiols, for example, as described in U.S. Pat. No. 4,689,387. The materials from which lenses, and in particular optical lenses, are fabricated can be categorized by their refractive indices. As is known to those of ordinary skill in the art, low indices typically include indices of refraction of from less than 1.50 through 1.53; middle indices comprise indices of refraction of from 1.54 through 1.57; and high indices commonly include indices of refraction of 1.58 and greater. Lenses prepared from polymeric materials having high refractive indices typically also have lower Abbe numbers (also known as nu-values). Lower Abbe numbers are indicative of an increasing level of chromatic dispersion, which is typically manifested as an optical distortion at or near the rim of the lens.

It is accordingly desirable then to identify new polymeric materials, i.e., polymerizates, and methods of preparing them from two-component organic compositions, e.g., compositions comprising polyisocyanate and polythiol components. It is further desirable that these polymerizates be transparent and, in particular, have utility as optical lenses that possess a combination of both high refractive index and adequately high Abbe numbers, e.g., preferably at least 33 and more preferably at least 35.

U.S. Pat. No. 5,693,738 describes a composition for a urethane-based plastic lens, comprising at least one compound including isocyanate and isothiocyanate compounds, and at least one active hydrogen compound including mercapto compounds. The composition is further described as comprising a tertiary amine and a Lewis acid.

U.S. Pat. No. 5,652,321 describes a composition for optical materials comprising a polyisocyanate having sulfide linkages and from 2 to 4 isocyanate groups, and a polythiol having two or more mercapto groups. Optical products provided by the composition are described as having very high refractive index and excellent heat resistance.

U.S. Pat. No. 5,594,088 describes a process for preparing high refractive index lenses comprising mixing a polyisocyanate having two or more isocyanato groups, a polythiol having two or more thiol groups, and one or more surface active agents. The process farther includes polymerizing the mixture in a mold made of glass or metal.

In accordance with the present invention, there is provided a method of preparing a polymerizate comprising polymerizing a two-component composition comprising:
(a) a first component containing at least one polyfunctional reactant having at least two functional groups selected from the group consisting of isocyanate, isothiocyanate and combinations thereof; and
(b) a second component containing,
(i) a polythiol represented by the following general formula I,

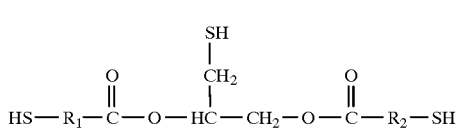

wherein $R_1$ and $R_2$ are each selected from the group consisting of straight or branched chain alkylene (usually containing from 1 to 20 carbon atoms, e.g., 1 to 10 carbon atoms, preferably 1 to 4 carbon atoms and more preferably 1 to 2 carbon atoms), cyclic alkylene (usually containing from 5 to 8 carbon atoms), and $C_1$–$C_9$ alkyl substituted phenylene, and
(ii) optionally a reactive hydrogen compound that is different than said polythiol (i), said reactive hydrogen compound having at least two reactive hydrogen groups selected from the group consisting of hydroxy, thiol and combinations of said reactive hydrogen groups. The first and second components are selected and polymerized to provide a polymerizate having a refractive index of at least 1.57, as determined in accordance with American Standard Test Method (ASTM) number D 542-95, an Abbe number, i.e., a nu-value, of at least 33, as determined using an appropriate instrument, e.g., a Bausch & Lomb ABBE-3L Refractometer, and an initial Barcol hardness (also commonly referred to as a zero second Barcol hardness) of at least 1, as determined in accordance with ASTM No. D 2583-95.

Unless otherwise indicated, all numbers expressing quantities of ingredients or reaction conditions used herein are to be understood as modified in all instances by the term "about".

DETAILED DESCRIPTION OF THE INVENTION

The second component of the two-component organic composition reacted in the method of the present invention contains a polythiol as described with reference to general formula I. As used herein, by "thiol", "thiol group", "mercapto" or "mercapto group" is meant an —SH group which is capable of forming a thiourethane linkage, i.e., —NH—C(O)—S—, with an isocyanate group or a dithiourethane linkage, i.e., —NH—C(S)—S—, with an isothiocyanate group.

With reference to general formula I, examples of straight or branched chain alkylenes from which $R_1$ and $R_2$ may each be selected include, but are not limited to, methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Examples of cyclic alkylenes from which $R_1$ and $R_2$ may each be selected include, but are not limited to, cyclopentylene, cyclohexylene, cycloheptylene cyclooctylene, bicyclo[2.2.1]heptylene and alkyl substituted derivatives thereof. The divalent linking groups $R_1$ and $R_2$ may also be selected from phenylene and alkyl substituted phenylene, e.g., methyl, ethyl, propyl, isopropyl and nonyl substituted phenylene. In a preferred embodiment of the present invention, $R_1$ and $R_2$ are each methylene or ethylene.

The polythiol represented by general formula I may be prepared from an esterification or transesterification reaction between 3-mercapto-1,2-propanediol (Chemical Abstract Service (CAS) Registry No. 96-27-5) and a thiol functional carboxylic acid or carboxylic acid ester in the presence of a strong acid catalyst, e.g., methane sulfonic acid, with the concurrent removal of water or alcohol from the reaction mixture. More particularly, a preferred polythiol monomer, for which $R_1$ and $R_2$ are each methylene with reference to general formula I, i.e., thioglycerol bis(2-mercaptoacetate), was prepared from the following ingredients.

| Ingredient | Amount (grams) |
|---|---|
| Charge 1 | |
| 3-mercapto-1,2-propanediol | 1995 |
| 2-mercaptoacetic acid | 2333 |
| methane sulfonic acid | 14.2 |
| Charge 2 | |
| aqueous ammonia[a] | 4218 |

[a]An aqueous solution of 5% by weight ammonia.

The ingredients of Charge 1 were added to a five liter round bottom flask equipped with a magnetic stirrer, a thermocouple and heating mantle coupled through a temperature feed-back control device, and a vacuum distillation column. A vacuum of from 5 to 10 millimeters (mm) of Hg was drawn and the reaction mixture was heated to and held at 70° C. for a period of 4 to 5 hours while water was collected from the distillation column.

When no more water was observed to be collected from the distillation column, the reaction mixture was cooled to room temperature and transferred to a six liter round bottom flask equipped with a motor driven stir-blade, a thermocouple and a water cooled jacket. Charge 2 was added to the mixture, which was then stirred for 30 to 45 minutes with an accompanying exotherm of from 10° C. to 20° C. Upon cooling to room temperature, the reaction mixture was left standing to allow the accumulation of an upper ammonia layer, which was removed by suctioning with a pipette. The remaining lower layer was washed three times each with two liters of deionized water. Vacuum stripping of water from the washed layer yielded 1995 grams of thioglycerol bis(2-mercaptoacetate) in the form of a yellowish oil having a refractive index of 1.5825.

As presented herein, the polythiol (b) (i) described and named with reference to general formula I, e.g., thioglycerol bis(2-mercaptoacetate), is meant to include also any related co-product oligomeric species and polythiol monomer compositions containing residual starting materials. For example, when washing the reaction mixture resulting from the esterification of 3-mercapto-1,2-propanediol and a thiol functional carboxylic acid, e.g., 2-mercaptoacetic acid, with excess base, e.g., aqueous ammonia, oxidative coupling of thiol groups may occur. Such an oxidative coupling can result in the formation of oligomeric polythiol species having disulfide linkages, i.e., —S—S— linkages.

The second component of the two-component organic composition may optionally include a reactive hydrogen compound that is different than polythiol (b) (i), and which is selected from: a polyol having two or more hydroxy groups; a second polythiol having at least two thiol groups, which is different than polythiol (b) (i) described with reference to general formula I; a compound having both hydroxy and thiol groups; and combinations of such reactive hydrogen compounds. As used herein, by "reactive hydrogen compound" is meant a compound having reactive hydrogen groups that are capable of forming covalent bonds with isocyanate and isothiocyanate groups. The reactive hydrogen compound may be included in the second component to optimize the physical properties of a polymerizate prepared by the method of the present invention. If used, the reactive hydrogen compound may typically be present in an amount of, for example, not greater than 80% by weight, preferably not greater than 50% by weight, more preferably not greater than 25% by weight, and particularly preferably not greater than 10% by weight, based on the combined total weight of polythiol (b) (i) represented by general formula I and the reactive hydrogen compound.

Examples of suitable second polythiols include, but are not limited to, 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, 4,4'-isopropylidenediphenol bis(2-mercaptoacetate), 4,4'-isopropylidenediphenol bis(3-mercaptopropionate), ethylene glycol di(2-mercaptoacetate), ethylene glycol di(3-mercaptopropionate), polyethylene glycol di(2-mercaptoacetate), polyethylene glycol di(3-mercaptopropionate) and mixtures thereof. Additional examples of second polythiols suitable for use in the present invention include those listed in U.S. Pat. No. 5,693,738 from column 7, line 38 through column 9, line 49, the disclosure of which is incorporated herein by reference. Preferred second polythiols include 2,2'-thiodiethanethiol, pentaerythritol tetrakis(2-mercaptoacetate), pentaerythritol tetrakis(3-mercaptopropionate) and mixtures thereof.

Classes of polyols that may optionally be included in the second component of the two-component composition include, but are not limited to: straight or branched chain alkane polyols, e.g., 1,2-ethanediol, 1,3-propanediol, 1,2-propanediol, 1,4-butanediol, 1,3-butanediol, glycerol, neopentyl glycol, trimethylolethane, trimethylolpropane, di-trimethylolpropane, erythritol, pentaerythritol and di-pentaerythritol; polyalkylene glycols, e.g., diethylene glycol, dipropylene glycol and higher polyalkylene glycols such as polyethylene glycols having number average molecular weights of, for example, from 200 to 2000 grams/mole; cyclic alkane polyols, e.g., cyclopentanediol, cyclohexanediol, cyclohexanetriol, cyclohexanedimethanol, hydroxypropylcyclohexanol and cyclohexanediethanol; aromatic polyols, e.g., dihydroxybenzene, benzenetriol, hydroxybenzyl alcohol and dihydroxytoluene; bisphenols, e.g., 4,4'-isopropylidenediphenol; 4,4'-oxybisphenol, 4,4'-dihydroxybenzophenone, 4,4'-thiobisphenol, phenolphthlalein, bis(4-hydroxyphenyl)methane, 4,4'-(1,2-ethenediyl)bisphenol and 4,4'-sulfonylbisphenol; halogenated bisphenols, e.g., 4,4'-isopropylidenebis(2,6-dibromophenol), 4,4'-isopropylidenebis(2,6-dichlorophenol) and 4,4'-isopropylidenebis(2,3,5,6-tetrachlorophenol); alkoxylated bisphenols, e.g., alkoxylated 4,4'-isopropylidenediphenol having from 1 to 70 alkoxy groups, for example, ethoxy, propoxy, α-butoxy and β-butoxy groups; and biscyclohexanols, which can be prepared by hydrogenating the corresponding bisphenols, e.g., 4,4'-isopropylidene-biscyclohexanol, 4,4'-oxybiscyclohexanol, 4,4'-thiobiscyclohexanol and bis(4-hydroxycyclohexanol)methane.

In one embodiment of the present invention the optional polyol of the second component is a polyurethane prepolymer having two or more hydroxy groups. Hydroxy functional polyurethane prepolymers useful in the present invention can be prepared from any of the above listed polyols and a suitable polyisocyanate. The ratio of molar equivalents of hydroxy groups to isocyanate groups being selected such that a hydroxy functional polyurethane prepolymer having essentially no free isocyanate groups is produced. Examples of polyisocyanates suitable for preparing hydroxy functional polyurethane prepolymers include those that may comprise the first component of the two-component composition of the present invention listed below. Hydroxy functional polyurethane prepolymers useful in the present invention typically have number average molecular weights (Mn) of less than 50,000, preferably less than 20,000, and more preferably less than 10,000 grams/mole, as determined by gel permeation chromatography (GPC) using polystyrene standards.

Examples of reactive hydrogen compounds having both hydroxy and thiol groups that may be optionally included in the second component include, but are not limited to, 2-mercaptoethanol, 3-mercapto-1,2-propanediol, glycerin bis(2-mercaptoacetate), glycerin bis(3-mercaptopropionate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, trimethylolpropane bis(2-mercaptoacetate), trimethylolpropane bis(3-mercaptopropionate), pentaerythritol mono(2-mercaptoacetate), pentaerythritol bis(2-mercaptoacetate), pentaerythritol tris(2-mercaptoacetate), pentaerythritol mono(3-mercaptopropionate), pentaerythritol bis(3-mercaptopropionate), pentaerythritol tris(3-mercaptopropionate), hydroxymethyl-tris(mercaptoethylthiomethyl)methane, 1-hydroxyethylthio-3-mercaptoethylthiobenzene, 4-hydroxy-4'-mercaptodiphenylsulfone, dihydroxyethyl sulfide mono(3-mercaptopropionate and hydroxyethylthiomethyl-tris(mercaptoethylthio)methane.

The first component of the two-component composition contains at least one polyfunctional reactant having at least two isocyanate groups, i.e., a polyisocyanate, at least two isothiocyanate groups, i.e., a polyisothiocyanate, or a combination of isocyanate and isothiocyanate groups. The scope of the present invention is inclusive of combinations of these polyfunctional reactants. As used herein, by "isocyanate group", i.e., -NCO, and "isothiocyanate group", i.e., —NCS, is meant a free, i.e., unblocked or uncapped, group which is capable of forming a covalent bond with a reactive hydrogen group, e.g., a thiol or hydroxy group.

Classes of polyisocyanates useful in the present invention include, but are not limited to: aliphatic polyisocyanates; ethylenically unsaturated polyisocyanates; alicyclic polyisocyanates; aromatic polyisocyanates wherein the isocyanate groups are not bonded directly to the aromatic ring, e.g., α,α'-xylene diisocyanate; aromatic polyisocyanates wherein the isocyanate groups are bonded directly to the aromatic ring, e.g., benzene diisocyanate; aliphatic polyisocyanates containing sulfide linkages; aromatic polyisocyanates containing sulfide or disulfide linkages; aromatic polyisocyanates containing sulfone linkages; sulfonic ester-type polyisocyanates, e.g., 4-methyl-3-isocyanatobenzenesulfonyl-4'-isocyanato-phenol ester; aromatic sulfonic amide-type polyisocyanates; sulfur-containing heterocyclic polyisocyanates, e.g., thiophene-2,5-diisocyanate; halogenated, alkylated, alkoxylated, nitrated, carbodiimide modified, urea modified and biuret modified derivatives of polyisocyanates belonging to these classes; and dimerized and trimerized products of polyisocyanates belonging to these classes.

Examples of aliphatic polyisocyanates useful in the present invention include, but are not limited to, ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, 2,4,4,-trimethylhexamethylene diisocyanate, 1,6,11-undecanetriisocyanate, 1,3,6-hexamethylene triisocyanate, 1,8-diisocyanato-4-(isocyanatomethyl)octane, 2,5,7-trimethyl-1,8-diisocyanato-5-(isocyanatomethyl)octane, bis(isocyanatoethyl)-carbonate, bis(isocyanatoethyl)ether, 2-isocyanatopropyl-2,6-diisocyanatohexanoate, lysinediisocyanate methyl ester and lysinetriisocyanate methyl ester.

Examples of ethylenically unsaturated polyisocyanates, include but are not limited to, butene diisocyanate and 1,3-butadiene-1,4-diisocyanate. Alicyclic polyisocyanates that are useful in the present invention include, but are not limited to, isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane and 2-isocyanatomethyl-2-(3-isocyanatopropyl)-6-(2-isocyanatoethyl)-bicyclo[2.2.1]-heptane.

Examples of aromatic polyisocyanates wherein the isocyanate groups are not bonded directly to the aromatic ring include, but are not limited to, bis(isocyanatoethyl)benzene, α,α,α',α'-tetramethylxylene diisocyanate, 1,3-bis(1-isocyanato-1-methylethyl)benzene, bis(isocyanatobutyl) benzene, bis(isocyanatomethyl)naphthalene, bis(isocyanatomethyl)diphenyl ether, bis(isocyanatoethyl) phthalate, mesitylene triisocyanate and 2,5-di (isocyanatomethyl)furan. Aromatic polyisocyanates, having isocyanate groups bonded directly to the aromatic ring, that are useful in the present invention include, but are not limited to, phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, ortho-tolidine diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, triphenylmethane triisocyanate, polymeric 4,4'-diphenylmethane diisocyanate, naphthalene triisocyanate, diphenylmethane-2,4,4'-triisocyanate, 4-methyldiphenylmethane-3,5,2',4',6'-pentaisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate and dichlorocarbazole diisocyanate.

Aliphatic polyisocyanates containing sulfide linkages that may be used in the present invention include, but are not limited to, thiodiethyl diisocyanate, thiodipropyl diisocyanate, dithiodihexyl diisocyanate, dimethylsulfone diisocyanate, dithiodimethyl diisocyanate, dithiodiethyl diisocyanate, dithiodipropyl diisocyanate and dicyclohexylsulfide-4,4'-diisocyanate. Examples of aromatic polyisocyanates containing sulfide or disulfide linkages include, but are not limited to, diphenylsulfide-2,4'-diisocyanate, diphenylsulfide-4,4'-diisocyanate, 3,3'-dimethoxy-4,4'-diisocyanatodibenzyl thioether, bis(4-isocyanatomethylbenzene)-sulfide, diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate.

Aromatic polyisocyanates containing sulfone linkages that may be used in the present invention include, but are not limited to, diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyl-diphenylsulfone-3,3'-diisocyanate and 4,4'-dichlorodiphenylsulfone-3,3'-diisocyanate.

Examples of aromatic sulfonic amide-type polyisocyanates that may be used in the present invention include, but are not limited to, 4-methyl-3-isocyanato-benzenesulfonylanilide-3'-methyl-4'-isocyanate, dibenzenesulfonyl-ethylenediamine-4,4'-diisocyanate, 4,4'-methoxybenzenesulfonyl-ethylenediamine-3,3'-diisocyanate and 4-methyl-3-isocyanato-benzenesulfonylanilide-4-ethyl-3'-isocyanate.

Classes of polyisothiocyanates useful in the present invention include, but are not limited to: aliphatic polyisothiocyanates; alicyclic polyisothiocyanates, e.g., cyclohexane diisothiocyanates; aromatic polyisothiocyanates wherein the isothiocyanate groups are not bonded directly to the aromatic ring, e.g., α,α'-xylene diisothiocyanate; aromatic polyisothiocyanates wherein the isothiocyanate groups are bonded directly to the aromatic ring, e.g., phenylene diisothiocyanate; heterocyclic polyisothiocyanates, e.g., 2,4,6-triisothicyanato-1,3,5-triazine and thiophene-2,5-diisothiocyanate; carbonyl polyisothiocyanates; aliphatic polyisothiocyanates containing sulfide linkages, e.g., thiobis (3-isothiocyanatopropane); aromatic polyisothiocyanates containing sulfur atoms in addition to those of the isothiocyanate groups; halogenated, alkylated, alkoxylated, nitrated, carbodiimide modified, urea modified and biuret modified derivatives of polyisothiocyanates belonging to these classes; and dimerized and trimerized products of polyisothiocyanates belonging to these classes.

Examples of aliphatic polyisothiocyanates useful in the present invention include, but are not limited to, 1,2-diisothiocyanatoethane, 1,3-diisothiocyanatopropane, 1,4-diisothiocyanatobutane and 1,6-diisothiocyanatohexane. Examples of aromatic polyisothiocyanates having isothiocyanate groups bonded directly to the aromatic ring include, but are not limited to, 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanato-1,1'-biphenyl, 1,1'-methylenebis(4-isothiocyanatobenzene), 1,1'-methylenebis(4-isothiocyanato-2-methylbenzene), 1,1'-methylenebis(4-isothiocyanato-3-methylbenzene), 1,1'-(1,2-ethane-diyl)bis (4-isothiocyanatobenzene), 4,4'-diisothiocyanatobenzophenenone, 4,4'-diisothiocyanato-3, 3'-dimethylbenzophenone, benzanilide-3,4'-diisothiocyanate, diphenylether-4,4'-diisothiocyanate and diphenylamine-4,4'-diisothiocyanate.

Carbonyl polyisothiocyanates useful in the composition of the present invention include, but are not limited to, hexanedioyl diisothiocyanate, nonaedioyl diisothiocyanate, carbonic diisothiocyanate, 1,3-benzenedicarbonyl diisothiocyante, 1,4-benzenedicarbonyl diisothiocyanate and (2,2'-bipyridine)-4,4'-dicarbonyl diisothiocyanate. Examples of aromatic polyisothiocyanates containing sulfur atoms in addition to those of the isothiocyanate groups, that may be used in present invention include, but are not limited to, 1-isothiocyanato-4-[(2-isothiocyanato)sulfonyl]benzene, thiobis(4-isothicyanatobenzene), sulfonylbis(4-isothiocyanatobenzene), sulfinylbis(4-isothiocyanatobenzene), dithiobis(4-isothiocyanatobenzene), 4-isothiocyanato-1-[(4-isothiocyanatophenyl)-sulfonyl]-2-methoxybenzene, 4-methyl-3-isothicyanatobenzene-sulfonyl-4'-isothiocyanate phenyl ester and 4-methyl-3-isothiocyanatobenzene-sulfonylanilide-3'-methyl-4'-isothiocyanate.

The first component of the present invention may also include a reactant having both isocyanate and isothiocyanate groups, which may be, for example, aliphatic, alicyclic, aromatic, heterocyclic, or contain sulfur atoms in addition to those of the isothiocyanate groups. Examples of such compounds, include, but are not limited to, 1-isocyanato-3-isothiocyanatopropane, 1-isocanato-5-isothiocyanatopentane, 1-isocyanato-6-isothiocyanatohexane, isocyanatocarbonyl isothiocyanate, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanato-4'-isothiocyanato-diphenyl sulfide and 2-isocyanato-2'-isothiocyanatodiethyl disulfide.

In one embodiment of the present invention, the polyfunctional reactant of the first component is a prepolymer having structural linkages within its backbone selected from the group consisting of urethane, i.e., —NH—C(O)—O—, thiourethane, i.e., —NH—C(O)—S—, urea, e.g., —NH—

C(O)—NH—, thiocarbamate, i.e., —NH—C(S)—O—, dithiourethane, i.e., —NH—C(S)—S—, thiourea, e.g., —NH—C(S)—NH—, and combinations of these structural linkages. The isocyanate and/or isothiocyanate functional prepolymer of the first component can be prepared from one or more monomers having at least two reactive hydrogen groups, e.g., thiol, hydroxy, primary amine and secondary amine groups, and one or more monomers having two or more groups selected from isocyanate, isothiocyanate and combinations of isocyanate and isothiocyanate. The molar equivalent ratio of reactive hydrogen groups to, for example, isocyanate groups, is selected such that the resulting prepolymer will have the desired functional groups, e.g., isocyanate groups.

Examples of polyols, polythiols and reactive hydrogen compounds having both hydroxy and thiol groups that may be used in preparing the isocyanate and/or isothiocyanate functional prepolymer of the first component include, but are not limited to, those listed above for use in the second component. Primary and secondary polyamines that may be used in this preparation include, for example, any of the family of family of ethyleneamines, e.g., ethylenediamine (EDA), diethylenetriamine (DETA), triethylenetetramine (TETA), tetraethylenepentamine (TEPA), pentaethylenehexamine (PEHA), piperazine, i.e., diethylenediamine (DEDA), and 2-amino-1-ethylpiperazine. Suitable monomers having two or more isocyanate and/or isothiocyanate groups include, but are not limited to, those listed above for use in the first component of the two-component composition.

The isocyanate and/or isothiocyanate functional prepolymer of the first component may be used alone or in combination with one or more non-polymeric polyisocyanate, polyisothiocyanate and poly(isocyanate-isothiocyanate) reactants, as described and listed above. The Mn of the isocyanate and/or isothiocyanate functional prepolymer of the first component is typically less than 50,000, preferably less than 20,000, and more preferably less than 10,000 grams/mole, as determined by GPC using polystyrene standards. Preferably the prepolymer of the first component is a polyurethane prepolymer having at least two isocyanate groups.

Polymerization of the two-component organic composition in accordance with the method of the present invention may be accomplished by: mixing the first and second components together using, for example, an impeller or extruder; optionally degassing the combined mixture; optionally adding the mixture to a mold; and then heating the mold and the mixture within it over a period of time. The thermal cure cycle utilized may vary depending on, for example, the reactivity and molar ratio of the components used and the presence of any catalyst(s). Typically, the thermal cure cycle involves heating the combined mixture of the two-component composition from room temperature to as high as 200° C. over a period of from 0.5 hours to 72 hours.

Catalysts that may be used with the two-component composition include, for example, tertiary amines, e.g., triethylamine, triisopropylamine and N,N-dimethylbenzylamine, and organometallic compounds, e.g., dibutyltin dilaurate, dibutyltin diacetate and stannous octoate. Additional examples of tertiary amines are listed in U.S. Pat. No. 5,693,738 at column 10 lines 6 through 38, the disclosure of which is incorporated herein by reference. Additional examples of organometallic compounds useful as catalysts are listed in U.S. Pat. No. 5,631,339 at column 4, lines 26 through 46, the disclosure of which is incorporated herein by reference. If used, catalysts are typically incorporated into the second component prior to the combination of the first and second components of the two-component composition. Catalysts levels are typically less than 5% by weight, preferably less than 3% by weight and more preferably less than 1% by weight, based on the total weight of the combined first and second components.

The first and second components of the two-component composition are typically polymerized together in amounts sufficient to provide a molar equivalent ratio of (NCO+NCS) groups to (OH+SH) groups of from 0.5 to 3.0, preferably from 0.5 to 1.5, and more preferably form 0.8 to 1.2.

Various conventional additives may be incorporated into the two-component organic composition polymerized in the method of the present invention. Such additives may include light stabilizers, heat stabilizers, antioxidants, ultraviolet light absorbers, mold release agents, static (non-photochromic) dyes, pigments and flexibilizing additives, e.g., alkoxylated phenol benzoates and poly(alkylene glycol) dibenzoates. Antiyellowing additives, e.g., 3-methyl-2-butenol, organo pyrocarbonates and triphenyl phosphite (CAS registry no. 101-02-0), may also be added to two-component organic composition to enhance resistance to yellowing. Such additives are typically present in the two-component composition in amounts totaling less than 10% by weight, preferably less than 5% by weight, and more preferably less than 3% by weight, based on the total weight of the combined first and second components. While such conventional additives may be added to either of the first or second components of the composition, they are typically incorporated into the second component to minimize the potential of adverse interactions with the isocyanate or isothiocyanate groups of the first component.

Polymerizates prepared in accordance with the method of present invention will be solid, and preferably transparent, e.g., suitable for optical or ophthalmic applications. The polymerizates of the present invention will also have a refractive index of at least 1.57, preferably at least 1.58 and more preferably at least 1.59, adequately high Abbe numbers, e.g., an Abbe number of at least 33 and preferably at least 35, and a zero second Barcol hardness of at least 1. The reactants and compounds comprising the first and second components of the two-component composition are selected and combined in amounts that allow the preparation of a polymerizate therefrom, which possesses the above listed characteristics. Solid articles that may be prepared according to the method of the present invention include, but are not limited to, optical lenses, such as plano and ophthalmic lenses, sun lenses, windows, automotive transparencies, e.g., windshields, sidelights and backlights, and aircraft transparencies, etc.

When used to prepare photochromic articles, e.g., lenses, the polymerizate should be transparent to that portion of the electromagnetic spectrum which activates the photochromic substance(s) incorporated in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form. Photochromic substances that may be utilized with the polymerizates of the present invention are organic photochromic compounds or substances containing same that may be incorporated, e.g., dissolved, dispersed or diffused into such polymerizates.

A first group of organic photochromic substances contemplated for use to form the photochromic articles of the present invention are those having an activated absorption maximum within the visible range of greater than 590 nanometers, e.g., between greater than 590 to 700 nanometers. These materials typically exhibit a blue, bluish-green, or bluish-purple color when exposed to ultraviolet light in an appropriate solvent or matrix. Examples of classes of such substances that are useful in the present invention include, but are not limited to, spiro(indoline)naphthoxazines and spiro(indoline)benzoxazines. These and other classes of such photochromic substances are described in the open literature. See for example, U.S. Pat. Nos. 3,562,172; 3,578, 602; 4,215,010; 4,342,668; 5,405,958; 4,637,698; 4,931, 219; 4,816,584; 4,880,667; 4,818,096. Also see for example: Japanese Patent Publication 62/195383; and the text, *Techniques in Chemistry,* Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use to form the photochromic articles of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

Other photochromic substances contemplated are photochromic organo-metal dithizonates, i.e., (arylazo)-thioformic arylhydrazidates, e.g., mercury dithizonates which are described in, for example, U.S. Pat. No. 3,361, 706. Fulgides and fulgimides, e.g. the 3-furyl and 3-thienyl fulgides and fulgimides which are described in U.S. Pat. No. 4,931,220 at column 20, line 5 through column 21, line 38.

The disclosures relating to such photochromic substances in the aforedescribed patents are incorporated herein, in toto, by reference. The photochromic articles of the present invention may contain one photochromic substance or a mixture of photochromic substances, as desired. Mixtures of photochromic substances may be used to attain certain activated colors such as a near neutral gray or brown.

Each of the photochromic substances described herein may be used in amounts and in a ratio (when mixtures are used) such that a polymerizate to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic substances. The relative amounts of the aforesaid photochromic substances used will vary and depend in part upon the relative intensities of the color of the activated species of such compounds, and the ultimate color desired.

The photochromic compounds or substances described herein may be applied to or incorporated into the polymerizate by various methods described in the art. Such methods include dissolving or dispersing the substance within the polymerizate, e.g., imbibition of the photochromic substance into the polymerizate by immersion of the polymerizate in a hot solution of the photochromic substance or by thermal transfer; providing the photochromic substance as a separate layer between adjacent layers of the polymerizate, e.g., as a part of a polymer film; and applying the photochromic substance as part of a coating placed on the surface of the polymerizate. The term "imbibition" or "imbibe" is intended to mean and include permeation of the photochromic substance alone into the polymerizate, solvent assisted transfer absorption of the photochromic substance into a porous polymer, vapor phase transfer, and other such transfer mechanisms.

The amount of photochromic substance or composition containing same applied to or incorporated into the polymerizate is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical polymerizate may range from 0.15 to 0.35 milligrams per square centimeter of surface to which the photochromic substance(s) is incorporated or applied.

It is also contemplated that photochromic substances may be added to the two-component organic composition prior to polymerizing, e.g., cast curing, the composition. However, when this is done it is preferred that the photochromic substance(s) be resistant to potentially adverse interactions with, for example, initiator(s) that may be present and/or the thiol, isocyanate and isothiocyante groups of the first and second components. These adverse interactions can result in deactivation of the photochromic substance(s), e.g., by trapping them in either an open or closed form. Photochromic substances can also include photochromic pigments and organic photochromic substances encapsulated in metal oxides, the latter of which are described in U.S. Pat. Nos. 4,166,043 and 4,367,170. Organic photochromic substances sufficiently encapsulated within a matrix of an organic polymerizate, as described in U.S. Pat. No. 4,931,220, may also be incorporated into the two-component composition of the present invention prior to curing. If photochromic substances are added to the two-component organic composition of the present invention prior to curing, they are typically incorporated into the second component prior to mixing the first and second components together.

The present invention has been described with reference to specific details of particular embodiments thereof. It is not intended that such details be regarded as limitations upon the scope of the invention except insofar as and to the extent that they are included in the accompanying claims.

We claim:

1. A method of preparing a polymerizate comprising polymerizing a two-component composition comprising:

(a) a first component containing at least one polyfunctional reactant having at least two functional groups selected from the group consisting of isocyanate, isothiocyanate and combinations thereof; and
(b) a second component containing,
  (i) a polythiol represented by the following general formula,

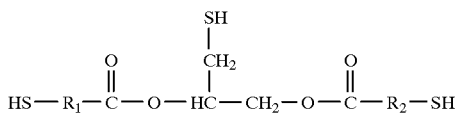

wherein $R_1$ and $R_2$ are each selected from the group consisting of straight or branched chain alkylene, cyclic alkylene, phenylene and $C_1$–$C_9$ alkyl substituted phenylene, and
  (ii) optionally a reactive hydrogen compound that is different than said polythiol (i), said reactive hydrogen compound having at least two reactive hydrogen groups selected from the group consisting of hydroxy, thiol and combinations of said reactive hydrogen groups; said first and second components being selected to provide said polymerizate having an initial Barcol hardness of at least 1, a refractive index of at least 1.57 and an Abbe number of at least 33.

2. The method of claim 1 wherein said polyfunctional reactant of said first component is a polyisocyanate having at least two isocyanate groups.

3. The method of claim 2 wherein said polyisocyanate is selected from the group consisting of α,α'-xylene diisocyanate, α,α,α',α'-tetramethylxylene diisocyanate, isophorone diisocyanate, bis(isocyanatocyclohexyl)methane, toluene diisocyanate, 4,4'-diphenylmethane diisocyanate and mixtures thereof.

4. The method of claim 1 wherein said polyfunctional reactant of said first component is a prepolymer having structural linkages within its backbone selected from the group consisting of urethane, thiourethane, urea, thiocarbamate, dithiourethane, thiourea and mixtures thereof.

5. The method of claim 4 wherein said prepolymer is a polyurethane prepolymer having at least two isocyanate groups.

6. The method of claim 1 wherein $R_1$ and $R_2$ are each selected from the group consisting of methylene and ethylene.

7. The method of claim 5 wherein $R_1$ and $R_2$ are each selected from the group consisting of methylene and ethylene.

8. The method of claim 1 wherein said reactive hydrogen compound of said second component is a second polythiol having at least two thiol groups, said second polythiol being different than said polythiol (b) (i).

9. The method of claim 8 wherein said second polythiol is selected from the group consisting of 2,2'-thiodiethanethiol, pentaerythritol tetrakis(2-mercaptoacetate), pentaerythritol tetrakis(3-mercaptopropionate) and mixtures thereof.

10. The method of claim 1 wherein said reactive hydrogen compound of said second component is a polyol having at least two hydroxy groups.

11. The method of claim 10 wherein said polyol is a polyurethane prepolymer having at least two hydroxy groups.

12. The method of claim 1 wherein said reactive hydrogen compound of said second component has both hydroxy and thiol groups.

13. The polymerizate made according to the method of claim 1.

14. The polymerizate made according to the method of claim 7.

15. A photochromic article comprising:
  (a) the polymerizate made according to the method of claim 1; and
  (b) a photochromic amount of organic photochromic substance.

16. A photochromic article comprising:
  (a) the polymerizate made according to the method of claim 7; and
  (b) a photochromic amount of organic photochromic substance.

17. The photochromic article of claim 16 wherein the organic photochromic substance is selected from the group consisting of spiro(indoline)naphthoxazines, spiro(indoline)benzoxazines, benzopyrans, naphthopyrans, chromenes, organo-metal dithizonates, fulgides and fulgimides and mixtures of such organic photochromic substances.

* * * * *